Figure 1:
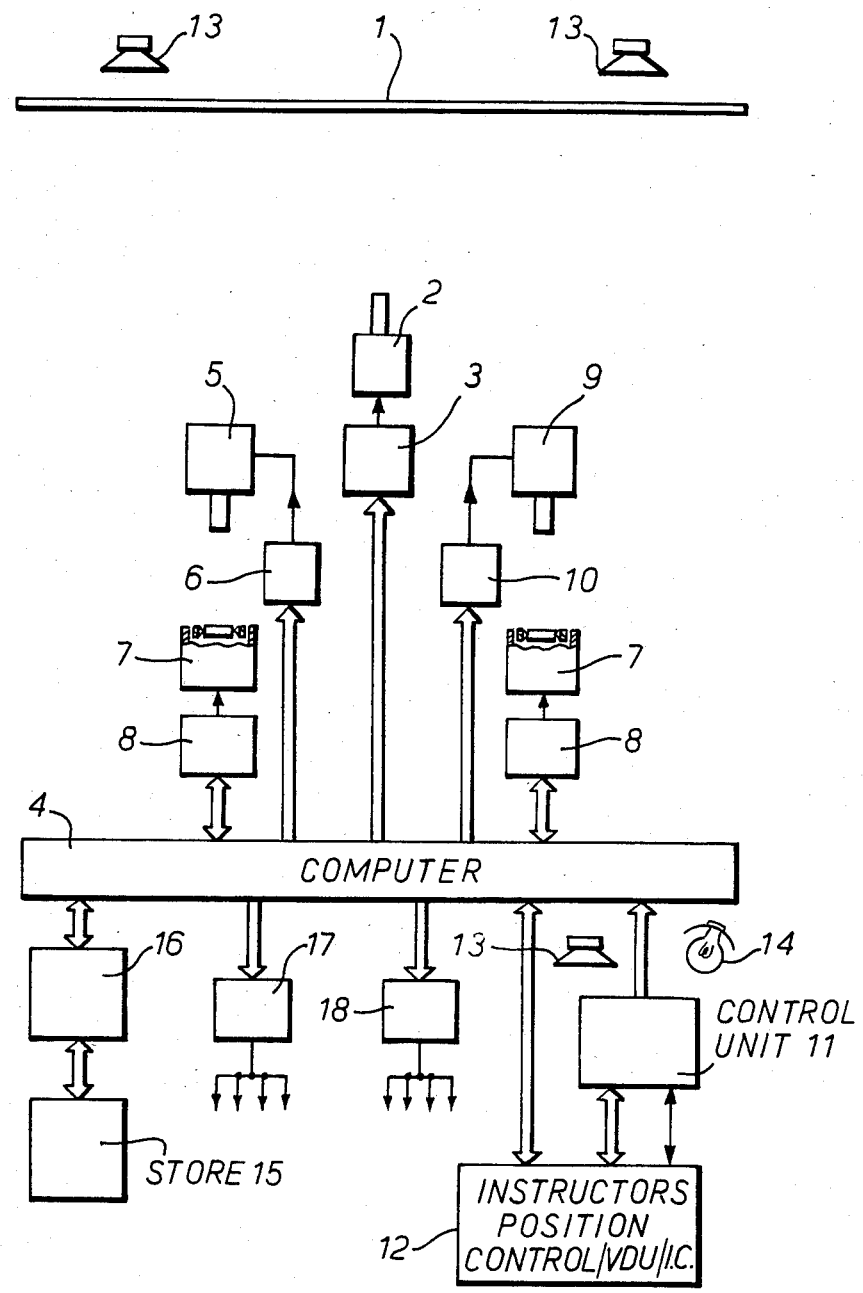

United States Patent [19]

Walmsley

[11] Patent Number: 4,552,533
[45] Date of Patent: Nov. 12, 1985

[54] GUIDED MISSILE FIRE CONTROL SIMULATORS

[75] Inventor: Dennis A. Walmsley, Hurstpierpoint, England

[73] Assignee: Invertron Simulated Systems Limited, England

[21] Appl. No.: 515,053

[22] PCT Filed: Nov. 15, 1982

[86] PCT No.: PCT/GB82/00325
§ 371 Date: Jul. 11, 1983
§ 102(e) Date: Jul. 11, 1983

[87] PCT Pub. No.: WO83/01832
PCT Pub. Date: May 26, 1983

[30] Foreign Application Priority Data

Nov. 14, 1981 [GB] United Kingdom ............... 8134375

[51] Int. Cl.$^4$ .............................................. F41G 7/00
[52] U.S. Cl. ......................................... 434/12; 434/20
[58] Field of Search ................... 434/11, 12, 20, 21, 434/16

[56] References Cited

U.S. PATENT DOCUMENTS

| | | | |
|---|---|---|---|
| 3,798,796 | 3/1974 | Stauff et al. | 434/20 |
| 4,232,456 | 11/1980 | Harmon et al. | 434/12 |
| 4,276,028 | 6/1981 | Gwynn | 434/20 |
| 4,290,757 | 9/1981 | Marshall et al. | 434/12 |
| 4,336,018 | 6/1982 | Marshall et al. | 434/20 |

FOREIGN PATENT DOCUMENTS

| | | | |
|---|---|---|---|
| 793374 | 4/1958 | United Kingdom | 434/11 |
| 1279873 | 6/1972 | United Kingdom | 434/16 |
| 2030683 | 4/1980 | United Kingdom | 434/16 |
| 2030685 | 4/1980 | United Kingdom | 434/16 |
| 2041177 | 9/1980 | United Kingdom | 434/12 |

*Primary Examiner*—Richard C. Pinkham
*Assistant Examiner*—Leo P. Picard
*Attorney, Agent, or Firm*—Roylance, Abrams, Berdo & Goodman

[57] ABSTRACT

A sophisticated computer controlled trainer and simulator for weapons using separate background, target, and missile projectors with active interaction between them all. The control computer synchronizes the output of the plurality of projectors so as to occult their individual objects and images. The system permits real time intervention and control by an instructor, and recording of each entire exercise for later replay and study.

23 Claims, 4 Drawing Figures

GUIDED MISSILE FIRE CONTROL SIMULATORS

The invention relates to guided missile fire control simulators for use in the training of personnel in the operation of guided missile launching and the control of the launched missile to strike a selected target in a simulated combat environment.

The use of simulators for the training of observers in the control of artillery fire has been known for some time. One known system is described in the United Kingdom Patent Specification No. 1,279,873, which describes the use of projectors for displaying a battlescene, selected targets superimposed thereon, and the further superimposition of an explosion image at a point computed to be the impact point at the end of the trajectory selected by the trainee observer.

Another known system is described in the United Kingdom Patent Application No. 2,030,685 A, which is generally similar, although more sophisticated computer arrangements are described and the preferred embodiment uses television projectors.

One object of the present invention is to provide a simulator that can reliably produce a simulation of the launch and flight of a guided missile under the control of a trainee operator towards a selected target, and to display the effect of the missile warhead exploding, whether as the result of a successful strike, or the result of an abortive attempt, assuming that the explosion is within the field of view of the operator.

The invention consists in a guided missile fire control simulator in which a plurality of image projectors are combined in a projection system under the control of a digital computer to display on a common screen:

a view of a selected combat area produced by a terrain image projector;

a view of a target superimposed on said terrain and produced by a target image projector;

a representation of the appearance of a guided missile in flight, as seen by the operator, which representation is superimposed upon the terrain view from a missile image projector, and which is occulted whenever the theoretical flight path takes the missile out of the view of the operator, and which is terminated by a visual representation of the effects of the missile warhead exploding only if the explosion or the effects thereof would be visible to the operator;

said target image projector and said missile image projector each being caused to project their image to respective positions on the screen by an associated projection directing system that is controlled by said computer;

an instructor's control station providing means for supervising an exercise by the production of relevant control signals;

and at least one missile control station providing means for a trainee to produce missile launch and guidance control signals;

said computer being supplied with exercise control data comprising:

stored information constituting an elevation database defining the displayed terrain;

stored information defining the visibility of any position in the displayed terrain to the operator and thus constituting a visibility database;

stored information concerning the missile flight characteristics and capabilities to constitute a weapon system database; and said computer uses said information to translate said control signals received from an operation control unit at and after launching of a missile into a resultant theoretical flight path for said missile and producing signals to control said projection direction system of said missile image projector to cause the projected image to follow the calculated path across the displayed terrain and to terminate the missile flight by an image projection representing the effect of explosion of the missile warhead if within the operator's field of view, but inhibiting such projection if theoretically outside the operator's field of view.

Advantageously, means may be provided to indicate the reason for any failure, such as may result from the missile being guided into the ground, or driven on a path exceeding its range capability, or being subjected to any flight maneuver that is beyond the particular missiles capabilities.

Figure 2:
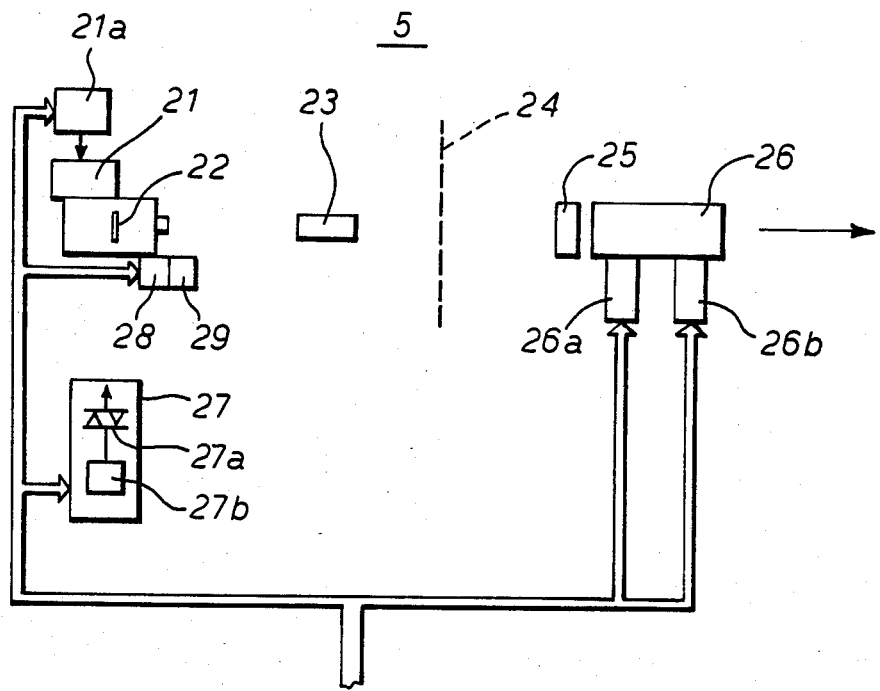
Figure 3:
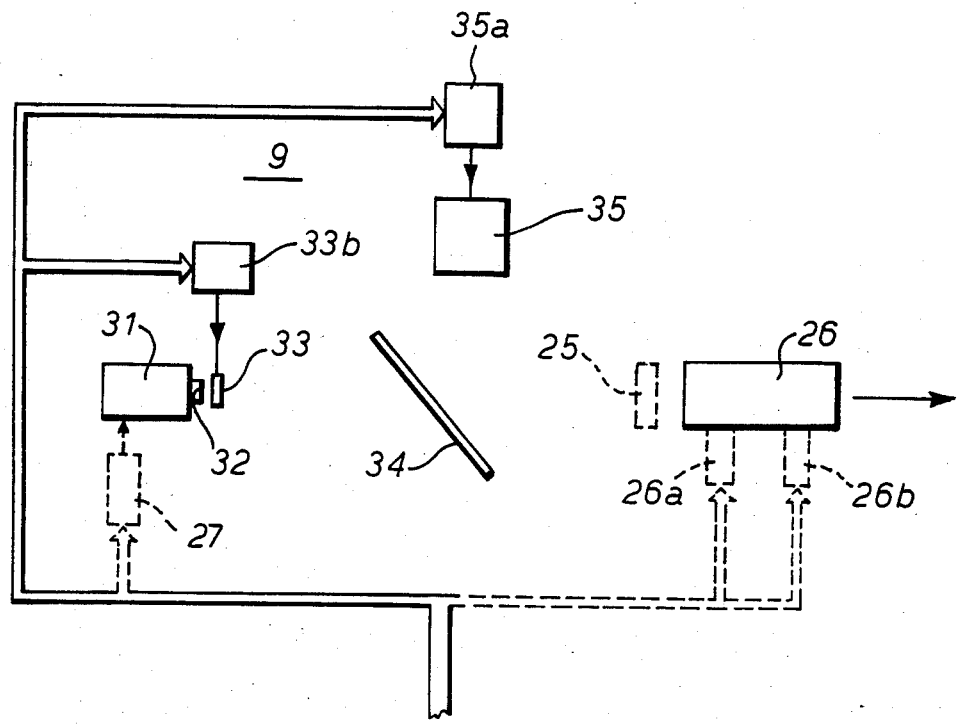
Figure 4:
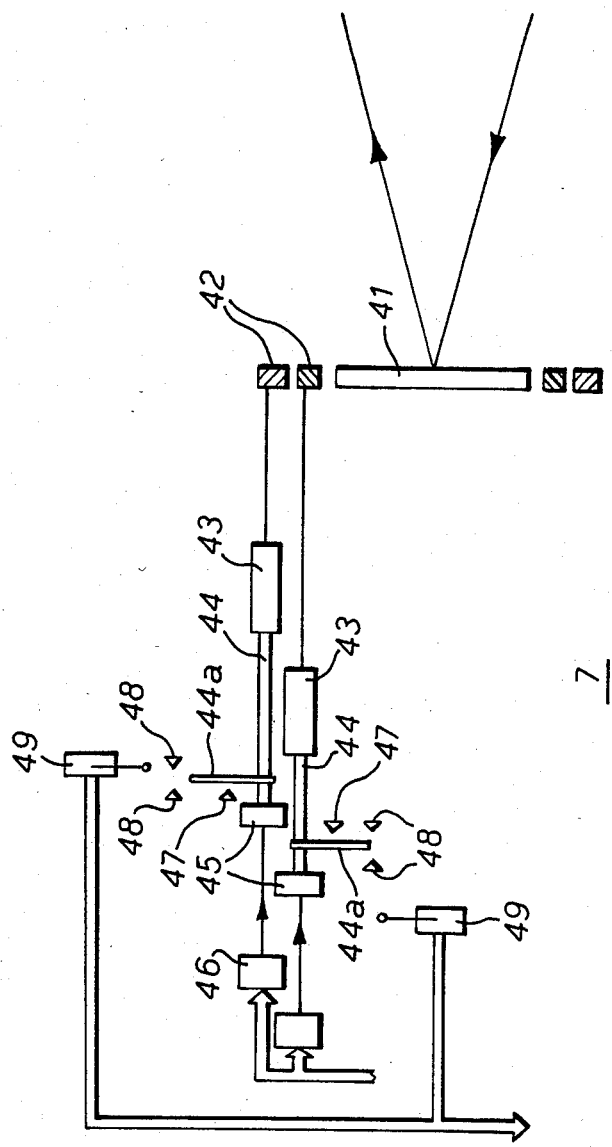

The invention, and further advantageous features thereof will now be described with reference to the drawings in which:

FIG. 1 is a block schematic diagram of one exemplary embodiment of the invention;

FIG. 2 schematically illustrates details of a target image projector for use in the embodiment shown in FIG. 1;

FIG. 3 schematically illustrates details of a missile image projector for use in the embodiment shown in FIG. 1; and FIG. 4 schematically illustrates details of an output-beam directing system for use in the embodiment shown in FIG. 1.

In the embodiment illustrated in FIG. 1, a screen 1 is positioned to display a terrain image that is projected on to the screen by a terrain image projector 2. A projector control unit 3 provides means for selecting any one slide from a magazine store or such slides (not shown), means for introducing a shutter into the light path, and means for controlling the brilliance of the projected image, all these control functions being operated by signals from a computer 4.

The simulator also comprises a plurality of target image projectors 5, of which only one is shown. Each of these projectors has a control unit 6 providing control means for selecting any one slide from a magazine store of such slides (not shown), means for controlling the setting of a zoom lens to vary the size of the image projected onto the screen 1, a shutter control, a brilliance control and a color filter control. Automatic focussing control means may be provided to correct the focus when the position of the target image is changed on the screen, as this change will result in a change in the length of the projection path. All these control means are operated by the computer 4.

To facilitate the steering of the projected image to the desired position on the screen at any instant, the target projectors 5 are positioned to project their output beams in a direction away from the screen, with an angle of tilt, and a respective plane front-surfaced mirror is positioned in each beam path, to reflect the projected image onto the screen 1. Each mirror forms part of an output-beam directing system 7, which will be described in more detail with reference to FIG. 4, and each mirror position is controlled by a respective control unit 8 that is operated by the computer 4.

The simulator also comprises at least one missile image projector 9, and only one is shown. This projector will be described in detail with reference to FIG. 3.

It is controlled by a control unit 10 operated by the computer 4 to provide control of the size and brilliance of the image and the projection of a flash-gun that is fired to simulate an explosion of a missile warhead, when required. The projectors 9 are mounted in a similar manner to the target image projectors 5, each having an associated output-beam directing system 7 with a control unit 8 identical to the means provided for steering the projected target images, as described above.

For use by the students who are to be trained on the simulator, a number of operators positions 11 are provided, each having a weapons system control unit of a type appropriate for the guided missile for which operational training is to be provided. The missile will be assumed for the sake of example to be of the wire guided type, and the control will provide launch and guidance facilities, and possible missile selection, as in some cases it may be assumed that the operator has control of a number of missiles capable of being remotely launched from a firing position separate from the observation point. Each operator's position is provided with auxiliary communication facilities to enable messages to be passed to or from an instructor's post 12, and furthermore loudspeakers 13 and effects lighting units 14 are provided to give each operator fully simulated combat stress conditions, including enemy fire for example.

In order to provide the computer 4 with the necessary information on which to base an exercise, a data store 15, which in this embodiment is a floppy disc store, contains stored data giving details of the elevation of the terrain selected for projection, point by point, considered from the launch point, (an elevation database), together with a coded representation of the visibility of each point in the terrain, considered from the operators view point (a visibility database), and data defining the performance capabilities of the weapon system concerned.

In this embodiment, there is also provision for the data store to hold details of pre-planned maneuvers by enemy targets, which enables the instructor to have more time for assessing the trainee operator's performance, and possibly introducing transient commands, such as wind gusts that may affect a missile's flight path, for example.

Furthermore, there may be provided one or more additional image projectors similar in construction to the target image projector 5 described above, each having an associated output-beam directing system, to project a simulation of smoke generated as a defensive screen which drifts down-wind and finally decays. The or each projector has its magazine containing an assortment of smoke silhouettes, and a masking "paddle" is mounted to move under the control of a computer program to progressively unmask the particular smoke symbol that has been selected, the projected image being steered by the control means from the computer, in like manner to that described for the target projectors, but with supervision from the instructor to vary wind-speed, the rate of decay of each smoke cloud, and the timing of smoke generation or of the firing of smoke rounds. Pre-planned programs can be used to simplify the instructor's task.

The store 15 may also be to record details of the exercise, including the response of the or each operator to the problems presented. This record can then be used to replay the exercise and enable operators to study their own performances, and appreciate the nature and importance of any mistakes they committed during the exercise.

In order to provide the computer 4 with access to the data stored in the memory device 15, a central processor 16 is used in known manner. The computer 4 then accepts commands and data from the operator's position 11, the instructor's position 12, and the control units 8, performs the required calculations and issues commands to the projectors 2, 5 and 9 via their control units 3, 6 and 10, respectively, steers the projected target and missile images by commands to the control units 8, and generates sound effects and lighting effects to control the loudspeakers 13 and lamps 14 via a sound effect generator 17 and an enemy fire simulator 18.

The training of personnel to use such guided weapons effectively presents numerous problems. Firstly, training using actual equipment (real rounds with live or dummy warheads) is prohibitively expensive if sufficient operators are to be trained and their skills maintained by practice firing. Secondly, training is not simply a matter of learning how to control the missile in its flight, since it may be of equal or greater importance to teach the ability to decide which of several targets is the correct one to engage, to distinguish between friend and foe, as in a real battle situation both may be simultaneously visible to the missile operator or his commander. Problems may arise in identifying the leader of an enemy armored formation, and in estimating whether a selected target will be able to reach cover before it can be reached by a missile launched against it.

To provide effective simulation, an optical projector provides a view of the terrain, in which the potential targets will appear, as seen from the point of view of the missile operator. The view may be changed under the control of the training instructor to present any one of a number of different, representative terrain views; and the instructor can control the intensity of the viewed scene at any level from full brilliance to very dim, and change to new levels within this range, as he wishes. The missile image projectors are of a special type whose purpose is to project upon the screen a representation of the appearance of a guided missile in flight as seen by the missile operator. This is typically the exhaust flame of the missile motor, which is represented by a colored image of roughly circular aspect whose size diminishes as the distance of the missile from the operator increases, and it must also be capable of projecting a representation of the effect of the missile warhead exploding, as seen by the missile operator. Full details of various constructions of missile image projectors will be given with reference to FIG. 3.

A missile control station is provided for each missile image projector, from which one or more missile operators under training can observe the projection screen and exercise a degree of control over the picture displayed thereon, notably with respect to the missile representation associated with the control station concerned. For this, each missile control station is provided with an actual missile control sight, or a mockup thereof, on which sufficient active controls are provided for the operator to exercise the necessary degree of control for the purpose of the training intended.

The number of target image projectors 5 is equal to or greater than the number of independently visible, moving targets seen on the projection screen. For example, if six such targets may be visible at one time, then six projectors will be actively engaged. Each projector is provided with the means of producing the following effects upon its associated target image:
  (a) Selection from a number of image sources, typically slide transparencies, representing different types of targets likely to be encountered, each at one or more scaled sizes; and different aspects or angles from which the target is viewed;
  (b) Selection of the intensity at which the image is seen, from full brilliance to zero, with a number of intermediate levels giving an effectively continuous gradiation between the extremes;
  (c) Means for occulting or displaying the projected image by the operation of a shutter in the optical path;
  (d) Selection of one color in which the projected target image is seen, to enable representation of an active enemy target, or an alternative color representing a target which is deemed to have been hit by a missile and thereby "stopped";
  (e) For a given image source size variation in the size of the image observed on the projection screen by variation in the effective focal length of the optical system of the projector ("zooming");
  (f) Optional compensation for the effects upon the focus of the projected image at the projection screen caused by changes in the effective projection length ("throw") as the image is steered to different points on the projection screen by the output-beam directing system concerned may be provided in some cases;
  (g) In a further optional arrangement beam modulation means may be provided to impose a "target identity" marking capable of being automatically recognized by detection means in given circumstances, as will be described later.

Further identical projectors may be provided, to minimize visual disturbance to observers of the projected images being caused by interruption of projection when it is desired to project a different slide, for example, when a moving target changes direction and a new aspect is required. By this means, one of the inactive projectors can be commanded to select the desired slide ready for projection, and the images cross-faded.

The output-beam directing systems steer the projected beam from its associated projector to any part of the projection screen, as commanded. For reasons of accuracy and stability, motors of the stepping type, controlled from a digital interface, are used. Because of their special characteristics, it is also necessary within the optical beam deflecting device to provide limit sensing devices to define the deflection limits permitted to the deflection devices, datum defining devices to align the system when first switched on or otherwise disturbed, and safety limit switches to guard against overrun of the mechanism in the event of failure of the limit sensing devices, as will be described with reference to FIG. 4.

The sound effects system enables the realism of the training environment to be enhanced by generating sounds associated with the launch of a missile, its passage away from the missile operator and the detonation of its warhead; the sounds typical of the movement of enemy targets; and the sound of enemy gunfire directed at the missile operator for the purpose of distraction and harassment. The system may also carry public address by the instructor. Because of the difficulties involved in the precise cueing of recordings on disc or tape, it has been found advantageous to generate effects via the computer, using a quasi-random number generator and a clock pulse source whose period can be varied, in order to vary the pitch and introduce variations in amplitude and bandwidth. Such effects have proved to be most realistic.

The simulator instructor's control station 12 will include a computer terminal having a visual display unit and a keyboard, from which the progress of the exercise can be controlled, and one or more target control units, from each of which a target can be controlled in all aspects, and which also controls enemy gunfire.

A master station may be provided, from which overall control of the training mission may be exercised.

The training equipment is adaptable to train operators in the method of use of a variety of guided weapons systems, the characteristics of the invention trainer being able to be varied to represent each weapon system as required. Thus the "mission profile" will be to some extent missile-system dependent, but would include most or all of the following steps:

(I) Prior to the use of the invention trainer for instructional purposes, the training staff would cause a selected terrain view to appear upon the projection screen, and also one or more enemy target images. By means of the target control unit these images would be caused to move; and behave in a manner which will present to the student the situation which the instructor intends.

During this phase, the training equipment would be set to record all the data being displayed upon the projection screen and all the changes as and when they occur—that is, the terrain view selected and the intensity of its projection, the continuously updated position of all targets, their size, aspect, intensity, color and whether occulted or not, and the incidence of associated sounds; also any enemy fire. The reason for this is that, while a target or targets may readily be moved "on-line" from the target control unit(s) during the training session proper, the training staff may be better employed in monitoring the student; also the behavior of the targets can be optimized to present the training situation desired for any level of student ability. Such recorded exercise data is retained in the computer storage medium (typically a "floppy disk" or disk pack) and pre-recorded scenarios may be produced as desired.

(II) The student, positioned at the missile control station 11, would then be exposed to the projected situation produced as in (I) above, and would evaluate the simulated threat, and apply tactical criteria in deciding which (if any) of the targets he would engage; and would inform the instructor accordingly.

(III) The student, having decided to engage a target, would initiate the launch of a missile using the controls available to him, appropriate to the type of missile system being simulated. The appropriate representation of the missile launch sound would be heard, and the missile image would appear on the projection screen at a position and after a time delay representative of the missile type being simulated. These factors depend upon the characteristics of the particular missile system; in some, the missile launcher unit and sight form a combined unit, while in others the sight may be separated from the launcher unit by up to several tens of meters for reasons of tactical concealment. Both types of system can be represented in the trainer, as can those systems in which the sight is an integral part of a vehicle. The missile operator then steers the missile using the controls available to him as appropriate to the missile system, in a manner to hit the target. During the run of the missile, various hazards may cause failure to make a hit.

A computer model of the elevation of all parts of the terrain view is held in the computer "elevation database" and the computer calculates on a continuous basis, the position in space of the missile. If the student steers the missile in such a way that it would hit the ground before reaching the target, the missile image is removed from the screen and a message is written on the visual display unit at the operator's position stating that the missile has crashed. Another stored computer model based on the elevation data noted above, takes into account the position and elevation of the missile operator, and which areas of the ground are consequently invisible to him, to form a "visibility database". If the missile is steered into such an area, the missile image is removed from the projection screen. If his subsequent control movements would cause the missile to fly into view again, the image will reappear. However, the elevation criterion also applies, as above, and the missile may be stated to have crashed, if the simulated conditions indicate this to have occurred while out of sight. The instructor may introduce wind effects of varying severity and these may additionally be steady or gusting. The missile flight path will be disturbed accordingly. The wind effects input may be manually introduced from the computer terminal during the run of the missile, or may be generated automatically by reference to the elevation database (so that a cross-wind gust occurs as the missile traverses a valley, for example).

The student may attempt to engage a target which is beyond the range of the simulated missile system. In this event the missile will crash when it is computed to have travelled to its maximum range, and a message will appear on the computer terminal showing the nature of the failure.

The student's control movements may fly the missile into regions of its flight envelope from which the real device could not recover—for example, extremes of upward pitch. If such regions are entered (depending upon the missile system concerned and the availability of possibly classified information concerning the missile behavior in such circumstances) the missile will crash and an appropriate message will be displayed at the computer terminal. The effects of enemy gunfire aimed at the missile operator's location, or the location of the launcher, may be introduced. In the real world, this is a counter-measure employed by the enemy not only to destroy the point from which missiles are controlled or launched, but is also effective even if the enemy does not know the exact location, as the effects of locally exploding ordnance is often sufficient to destroy the concentration of the missile operator long enough for him to lose control of the missile, which will therefore crash or at least miss the intended target. Thus, the instructor may introduce at will, or include in the scenario recorded prior to the training session, a representation of the sound of a high-explosive shell detonating nearby, which may also be accompanied by a representation of the flash which accompanies the explosion.

The computer continuously calculates the position in space of the missile, and of all targets in the exercise, whether they are being played back from previously recorded tracks or under manual control by the instructional staff, and visible or occulted (having passed into dead ground for example). If the calculated missile position coordinates are identical to those of a target, the missile has hit the target, and the computer can use the result to initiate projection of the effects of an explosion, assuming the calculated position is within sight of the operator, as determined by the visibility data base.

As an optional measure to assist the computer calculations and provide enhanced response times, the or each target projector 5 may be provided with means to modulate its projected light beam by variation of the output amplitude at a unique frequency above the flicker rate and any power supply induced component. The or each missile projector 9 can then be provided with a sensing element to supply an output signal to the computer 4 when such a frequency modulation is detected, as the two projector beams are then coincident and it only remains to determine if the ranges correspond. By providing a multi-segment detector the respective outputs can be compared, and whereas equal values indicates true coincidence, any discrepancy can be evaluated to determine the degree and direction of a miss.

Yet another alternative arrangement can employ a single detector which is nutated, or fed via a nutating mirror. In the absence of true coincidence the output will then have an amplitude modulation component at the frequency of nutation whose amplitude and phase can serve to indicate the magnitude of a miss. In any event, true coincidence causes a red flash of the missile warhead explosion to be seen on the projection screen 1 at the point of coincidence of the missile and target symbols, followed by the simulated sound of the explosion, after a time delay proportional to the distance of the target from the missile operator. The loudness of the sound is also reduced as the distance increases.

When the target is hit its color changes automatically to red to indicate it has been "stopped", and target motion then normally ceases. It is an important feature in training a person to become a proficient missile operator that the pattern of missile behavior engendered by the control movements made by the trainee shall be known, and undesirable trends corrected. It is not sufficient for the trainee to try simply to achieve the maximum number of hits on the selected target, since a 'hit' may simply be the lucky end-result of a wildly gyrating trajectory. Therefore, provision is made in the invention trainer to record, for the latter part of the missile's run, the percentage of the time that the missile is laid accurately on the target. The length of the recorded run may be varied by the instructor, but would be typically between 50 and 1000 meters, depending on the range of the target being engaged. The computer, knowing the coordinates of the missile and all the targets, is also programmed to calculate the distance and direction of closest approach of a missile to the target, so that in the event of the student failing to hit the target, the extent and direction of the error in aim is written onto the computer terminal screen for the information of the instructor.

The computer retains all data employed from the firing of the missile to the end of its run (from whatever cause), and therefore the mission can be replayed and the events viewed on the projection screen by the student and observers for the purposes of debriefing. This replay can be at real speed or at a slower speed, with the ability to "hold" (stop) the replay at any point as often as required, for maximum teaching benefit. The simulator can be made to represent any required weapon system, whether wire-guided, radio controlled, or even if using laser or other more sophisticated guidance systems.

The design of the target image projector 5 presents some difficulties, as the projected image is relatively small, and a correspondingly small transparent zone is provided on the projector slide, then there will be excessive limitation of the light output. For this reason the arrangement schematically shown in FIG. 2 has been adopted.

A magazine 21 loaded with a plurality, preferably eighty, different slides is provided in each projector. The set of slides is preferably identical in each projector, as the computer can then call up any available projector 5, select the appropriate slide, adjust the projector controls and steering, and cross-fade to initiate an apparent change of heading of a target projected on the screen.

The selected slide 22 is positioned in the light beam and an image projected by an objective lens 23 to form a focussed reduced image in a first image plane 24, which is then projected via a multiplying converter lens 25 and a main zoom-type lens 26. The computer effects control by means of 6-bit commands, which are translated into appropriate control functions by circuitry and/or transducer means.

The brilliance compound is used to trigger a semiconductor device 27a in a current control circuit 27, the switch-on being delayed after each zero-transit of an a.c. supply waveform by a length of time determined by the command word, which is fed to a shift register 27b to introduce at the most, a delay equal to the period required to enable the filament of the lamp to be heated to stand-by temperature in the residual time of that half-cycle. The register is fed by pulses from a clock pulse generator whose period is phase lock looped to that of the a.c. waveform. A shutter control 28 is of a simple two-position electro-mechanical design, and a two-color filter slide is controlled by a color-controller 29. A slide selector 21a must be designed to accommodate the requirements of the particular make of the projector and the magazine 21. Image focus control may be effected by rotation of the focus control element of the zoom lens 26, using a shaft and linkage drive 26a, and a drive 26b of greater sweep is used for setting the zoom position. If a modulated signal is to be imposed upon the target beam, then preferably the supply circuit is designed accordingly, and set to impose the required frequency of modulation although a rotating shutter could be employed.

FIG. 3 schematically shows details of the missile image projector 9. A projector lamp unit 31 provided with a suitably colored output aperture 32 emits light via a diaphragm 33 that can be adjusted in size by a control drive 33b to vary the apparent range of the missile image. A brilliance control arrangement 27 similar to that described with reference to FIG. 2 may be provided. The projected light passes through a semi-silvered mirror 34 to be focussed and projected by a lens arrangement similar to the arrangement 25, 26 of FIG. 2. In order to display the effect of a warhead explosion an electronic flash gun 35 can be triggered from the computer by a control circuit 35a.

The flash gun has its normal aperture covered by a mask in which there is an appropriately shaped aperture covered by a frosted colored filter. The different output is reflected by the mirror 34 to be projected via the lens system onto the screen 1. If the target projectors are provided with means for modulating their output beam, as described above, then each missile projector is provided with a photo-sensitive detector in a focussed image plane. Thus, a single or multi-segment detector could be provided at the output face of the flash gun 35, to recieve light entering from the screen and reflected by the mirror 34. Alternatively, a further semi-silvered mirror could be provided between the projector 31 and mirror 34 to deflect light entering via the lens 26 to the detector. The detector itself may be mounted to nutate, or the relevant mirror driven appropriately. Sensitive filter circuits are provided to monitor for the presence of a modulated projector-beam.

Each target image projector 5 and missile image projector 9 must have its output beam steered to the appropriate position on the projected terrain at any instant. To effect this control, each projector directs its beam to an associated output-beam directing system 7 of the type schematically illustrated in FIG. 4.

A plane, front-surfaced mirror 41 has a gimbal mount 42 which is provided with separate geared drive means 43 for each of its axes of rotation. Each geared drive means 43 has a rotatable drive shaft 44 driven by a respective stepping motor 45 that is controlled by commands from the computer via a decoding circuit 46. In this way, precise, reliable and repeatable steering control can be insured. To avoid setting up problems, each drive shaft 44 has an associated member 44a influencing a photo-electric sensor 47 designed to locate a reference starting position and optical limit stops 48. As the stepping motors apply very high torque, electro mechanical limit switches 49 are provided as a fail-safe measure.

The essential flexibility of the invention simulation system, with regard to its reaction time and the effectiveness of its display arises from the division of information relating to the combat scene displayed into two separate stores, the terrain database which holds the actual ground heights, point by point, and the visibility database, which stores the necessary data to allow for the effect imposed upon sight-lines by the presence of, and effective height of such natural phenomena as shrubs and trees, and also manmade features such as walls and buildings of all types.

The particular embodiment described employs optical projectors for terrain, target image and missile image projection. It will be readily apparent that television projection equipment could be used, and in this case it might be advantageous to use electronic circuitry to cause target image and missile image projection to be effected within the video circuits of a common television projector. Thus, the optical output beam directing systems of the described embodiment would be replaced by circuits gating the appropriate signals into the television video signal.

Some missile guidance systems require the operator to aim a sight towards the target at all times, particularly in systems having a sight combined with a launch tube. For such systems the missile projectors may be provided with beam modulation means such as are described above for the target projector, but using characteristic modulating frequencies. By the provision of a sensor in the sight of the angular position of the missile with respect to the axis of the sight can be determined and control signals derived to bring the missile onto the axis of the sight. The weapon sight is provided with a photo-electric detector having a number of sensitive sectors, typically arranged as four quadrants, positioned at the focus of a lens system. As the intensity of the missile projector is modulated, the photo-electric detector aligned such that the missile image is in the center of the field of view of the sight illuminates all sectors equally. The electrical output from each sector is therefore similar.

If the missile image is not in the center of the field of view of the weapon sight, differing outputs will be produced by the sectors of the photo-electric detector. These are then processed to derive error control signals which may be applied to the missile projector output beam control system in such a way as to bring the missile symbol back into the center of the field of view of the weapon sight. The purpose of the intensity modulation of the missile symbol is to enable the electronic circuits processing the outputs from the photo-electric detector to discriminate between the wanted signal from the missile image and the unwanted signal from the terrain projector, this modulation having a different frequency from that applied to the target symbols to avoid the weapon sight falsely deriving alignment data with respect to a target symbol.

In an alternative realization, the multi-segment photo-electric detector is replaced by one having a single detecting element which is nutated with respect to the focussed image of the missile symbol from the projection screen, either directly or by means of a moving mirror, the detector in this case remaining fixed. An electrical reference signal is generated in synchronism with the nutating movement and if the weapon sight is not pointing directly at the missile image on the screen, the electrical output from the photo-electric detecting element will have an amplitude modulation component at the frequency of nutation. By comparing the phase relationship between this component and the reference signal already mentioned, control signals may be derived which will drive the symbol back into the center of the field of view of the weapon sight when applied to the missile mirror control system.

A further problem occurs in the simulation of tube-launched missiles, as it is necessary to steer the missile symbol initially to a point on the projection screen which is the line of the launch tube produced to intersect the plane of the screen, after which it is moved in accordance with the steering signals derived as stated earlier.

To determine the pointing line of the launch tube to an accuracy sufficient only to insure that the missile symbol appears in the field of view of the sight having the greatest magnification on the launcher, a special optical projector is attached to the weapon sight and projects a symbol having the form of a cross onto the screen. The arms of the cross extend well beyond each edge of the screen, such that, wherever on the screen the sight is pointed, the arms of the cross will extend beyond each screen margin. An optical filter is placed in the light path to cut out visible light, leaving only invisible radiation (typically infra-red).

Along each edge of the screen, preferably just beyond the active area used for the terrain picture, there is arranged a respective linear array of photoelectric detectors sensitive to the radiation projected from the projector on the launch tube already described. The spacing of the detectors is such that in each array, at least one detector will be illuminated by the associated arm of the cross.

By processing the data from the illuminated detectors, typically from the vertical and the horizontal pairs of arrays, the pointing direction of the tube may be determined, and furthermore, by a differential comparison of data received from each array of a pair, any 'roll' misalignment of the launcher tube (which is typically shoulder-supported by the trainee and can therefore not be assumed stable) can be computed and corrected for While the invention has been described in detail above, it is to be understood that this detailed description is by way of example only, and the protection granted is to be limited only within the spirit of the invention and the scope of the following claims.

I claim:

1. A guided missile fire control simulator in which a plurality of image projectors are combined in a projection system under the control of a digital computer to display on a common screen:

a view of a selected combat area produced by a terrain image projector;

a view of a target superimposed on said view of said combat area and produced by a target image projector;

a representation of the appearance of a guided missile in flight, as seen by the operator, which representation is superimposed upon the terrain view from a missile image projector, and which is occulted whenever the theoretical flight path takes the missile out of the view of the operator, and which is terminated by a visual representation of the effects of the missile warhead exploding only if the explosion or the effects thereof would be visible to the operator;

said target image projector and said missile image projector each being caused to project their image to respective positions on the screen by respective associated projection directing system controlled by said computer;

an instructor's control station providing means for supervising an exercise by the production of relevant control signals;

and at least one missile control station providing means for the operation to produce missile launch and guidance control signals;

said computer being supplied with exercise control data comprising;

stored information constituting an elevation database defining the displayed terrain;

stored information defining the visibility of any position in the displayed terrain to the operator and thus constituting a visibility database;

stored information concerning the missile flight characteristics and capabilities to constitute a weapon system database;

and said computer using said information to translate said control signals received from an operator's control unit at and after launching of a missile into a resultant theoretical flight path for said missile and producing signals to control said projection directing system of said missile image projector to cause the projected image to follow the calculated path across the displayed terrain and to terminate the missile flight by an image projection representing the effect of explosion of the missile warhead if within the operator's field of view, but inhibiting such projection if theoretically outside the operators field of view.

2. A guided missile fire control simulator as claimed in claim 1, in which said exercise control data further comprises stored information relating to preplanned movement of the target.

3. A guided missile fire control simulator as claimed in claim 1 or claim 2, in which an instructors control unit is provided having means for over-riding the operators or computers control signals and/or injecting transient commands such as the effect of wind gusts on the missile flight path.

4. A guided missile fire control simulator as claimed in claim 1, in which said target image projector is a magazine-loaded optical slide projector.

5. A guided missile fire control simulator as claimed in claim 4, in which there is a plurality of said target image projectors, each with a separate associated output-beam directing system.

6. A guided missile fire control simulator as claimed in claim 5, in which each said target image projector has a magazine containing a mutually identical set of slides giving different range and heading views of a common target.

7. A guided missile fire control simulator as claimed in claim 5, in which the or each said target image projector comprises a slide projector unit with a selective color filter controllably positioned in the output light path, an objective lens positioned to produce a reduced focussed image in a first image plane from which a zoom lens system projects the image to the screen, the effective focal length of the zoom lens being multiplied.

8. A guided missile fire control simulator as claimed in claim 7, in which transducers are provided to enable the computer to control zoom for the desired image position and size.

9. A guided missile fire control simulator as claimed in claim 8, in which means provide focus correction for the actual lens-to-screen distance as determined by the setting of the associated projection directing system at any instant.

10. A guided missile fire control simulator as claimed in claim 1 in which said missile image projector is a light projector having a variable output diaphragm.

11. A guided missile fire control simulator as claimed in claim 10, in which there is a plurality of said missile image projectors, each with a separate associated output-beam directing system.

12. A guided missile fire control simulator as claimed in claim 5 or 11, in which each said output-beam direction system is of mutually similar design.

13. A guided missile fire control simulator as claimed in claim 5 or 11 in which each said output-beam directing system consists of a plane front-surfaced mirror supported in a gimbal mount in the output beam of the associated projector on that side of the projector remote from said screen and with the two axes of rotation each controlled by a respective stepping motor driven by said computer, the stepping motor output shaft being linked to the associated support via a gear drive, and the setting at any instant being effected by reference to a datum plane indicated by means of an associated sensing device which further comprises limit stop means, and electro-mechanical limit stops being provided as a fail-safe precaution.

14. A guided missile fire control simulator as claimed in claim 11, in which the or each said missile image projector comprises a light projector producing an output beam whose cross-section is controlled to approximate the size of the missile on the screen by adjustment of said output diaphragm that is controlled from the computer by means of a transducer, the resultant beam passing via a semi-silvered mirror to a lens system, and in which there is provided an electronic flash unit positioned to project an explosion image via said semi-silvered mirror and said lens system.

15. A guided missile fire control simulator as claimed in claim 14, in which said lens system includes a zoom lens whose zoom setting is adjusted from the computer by an associated transducer.

16. A guided missile fire control simulator as claimed in claim 1, in which the or each operator's control unit has an associated sound generating system for the production of acoustic effects simulating combat conditions.

17. A guided missile fire control simulator as claimed in claim 16, in which said sound generating system incorporates a synthesiser producing noise effects by means of a quasi-random number generator driven by a clock-pulse source whose period can be arbitrarily varied.

18. A guided missile fire-control simulator as claimed in claim 1, in which the or each said operator's control unit has an associated optical effects generator to simulate enemy fire and other combat hazards.

19. A guided missile fire control simulator as claimed in claim 1, in which means are provided for the computer to vary the brilliance of any selected projector.

20. A guided missile fire control simulator as claimed in claim 19, in which said brilliance is varied by controlling the switch-on time of a semiconductor device in each half-cycle of an a.c. supply waveform, using a shift register whose content determines the delay period before an applied clock pulse train produces switch-on, the maximum delay being such that a switch-on is effected on each half-cycle to maintain a stand-by operating temperature without producing any significant light output in the absence of earlier controlled switch-on, and the clock pulse train being produced by a clock circuit whose period is set by a phase-locked loop circuit in dependence upon the frequency of the a.c. supply waveform at any instant.

21. A guided missile fire control simulator as claimed in claim 1, in which means are provided to modulate at least one of the target and the missile projectors to superimpose a characteristic frequency on the respective output beam, and detector means are provided on said missile projectors and/or on a weapon sight to detect any modulated signal on the output beam of a target projector or missile projector, as the case may be.

22. A guided missile fire control simulator as claimed in claim 21, in which said detector means are arranged to sense the degree of any misalignment.

23. A guided missile fire control simulator as claimed in claim 21, in which said weapon sight has an associated projector for invisible light producing a projected image of a cross extending outside the projected terrain image to selectively illuminate individual elements in respective arrays arranged one along each edge of said screen.

* * * * *